US008052126B2

(12) United States Patent
Xu et al.

(10) Patent No.: US 8,052,126 B2
(45) Date of Patent: Nov. 8, 2011

(54) LIQUID DISTRIBUTION IN CO-CURRENT CONTACTING APPARATUSES

(75) Inventors: Zhanping Xu, East Amherst, NY (US); Brian Nowak, Orchard Park, NY (US)

(73) Assignee: UOP LLC, Des Plaines, IL (US)

( * ) Notice: Subject to any disclaimer, the term of this patent is extended or adjusted under 35 U.S.C. 154(b) by 438 days.

(21) Appl. No.: 12/391,844

(22) Filed: Feb. 24, 2009

(65) Prior Publication Data

US 2010/0163397 A1   Jul. 1, 2010

Related U.S. Application Data

(60) Provisional application No. 61/141,702, filed on Dec. 31, 2008.

(51) Int. Cl.
*B01D 3/26* (2006.01)
*B01F 3/04* (2006.01)

(52) U.S. Cl. ................. 261/110; 261/114.5; 202/158

(58) Field of Classification Search ........... 261/114.1, 261/114.5, 110; 96/299, 188–190, 355, 358; 95/213; 202/158, 162
See application file for complete search history.

(56) References Cited

U.S. PATENT DOCUMENTS

| 5,158,713 | A | 10/1992 | Ghelfi et al. ............... 261/97 |
| 5,645,770 | A | 7/1997 | McNulty et al. ............ 261/97 |
| 5,702,647 | A * | 12/1997 | Lee et al. ................ 261/114.5 |
| 6,059,272 | A | 5/2000 | Potthoff et al. .............. 261/97 |
| 6,390,454 | B1 * | 5/2002 | Urbanski et al. .......... 261/114.1 |
| 6,502,806 | B2 | 1/2003 | Richardson ................. 261/97 |
| 6,682,633 | B1 | 1/2004 | Xu et al. ..................... 203/1 |
| 6,746,003 | B2 * | 6/2004 | Lee et al. ................ 261/114.1 |
| 6,783,120 | B2 * | 8/2004 | Shakur et al. ........... 261/114.1 |
| 7,112,312 | B2 | 9/2006 | Chou ........................ 422/220 |
| 7,125,004 | B2 | 10/2006 | Dollie et al. ................. 261/97 |
| 7,137,622 | B2 | 11/2006 | Buchanan ................ 261/114.1 |
| 7,232,115 | B2 * | 6/2007 | Sastry .................... 261/114.1 |
| 7,276,215 | B2 | 10/2007 | Müller ..................... 422/224 |
| 2003/0193099 | A1 | 10/2003 | Xu et al. |
| 2007/0137482 | A1 | 6/2007 | Xu et al. ..................... 95/198 |

FOREIGN PATENT DOCUMENTS

EP   0773050 A1   5/1997
WO   WO 2007/081622 A2   7/2007

OTHER PUBLICATIONS

Zhanping Xu et al., "SimulFlow™ Device—Capacity Beyond System Limit," UOP LLC, 175 E. Park Dr., Tonawanda, NY 14050-0986 and UOP LLC, 13105 Northwest Freeway, Suite 600, Houston, TX 77040-6312.

(Continued)

*Primary Examiner* — Frank Lawrence, Jr.
(74) *Attorney, Agent, or Firm* — Mark Goldberg (57) ABSTRACT

Fluid distribution systems, and particularly those for distributing liquids into apparatuses containing modules used to carry out vapor-liquid contacting, are described. Representative liquid distribution systems comprise an extended trough having a plurality of outlet spouts that are aligned for distribution into a plurality of downcomers. The downcomers may be in non-parallel (e.g., orthogonal) alignment with respect to the trough and/or the number of troughs may be less than the number of downcomers to which fluid is distributed.

7 Claims, 11 Drawing Sheets

OTHER PUBLICATIONS

Zhanping Xu et al., "High Capacity Co-Current Flow Distillation Internals," UOP LLC, 175 E. Park Dr., Tonawanda, NY 14150 and UOP LLC, 25 E. Algonquin Rd., Des Plaines, IL 60017-5017, Nov. 2007.

Christensen, G. et al., "Cocurrent Downflow of Air and Water in a Two-Dimensional Packed Column," AIChE Journal, v 32, n 10, Oct. 1986, pp. 1677-1689.

Maiti, R.N. et al., "Gas-Liquid Distributors for Trickle-Bed Reactors: A Review," Industrial and Engineering Chemistry Research 46(19) 2007, pp. 6164-6182, American Chemical Society.

D. William Tedder et al., "Improving Hydraulics and Efficiencies with the T-By Sieve Tray," School of Chemical Engineering, Georgia Institute of Technology, Atlanta, GA 30332; Dept. of Chemical Engineering, Separations Research Program, University of Texas, Austin, TX 78712, 3UNI-FRAC, Inc., Salt Lake City 84119, AIChE Journal vol. 39, Issue 4, pp. 569-580, published online Jun. 17, 2004.

Trutna, W., "Cocurrent Contactor Raises [Distillation] Column Throughput," University of Texas Center for Energy Studies, Chemical Engineering (ISSN 0009-2460) V98 N.2 pp. 19-20 (Feb. 1991) chemical Week Associates.

Jacobs, G.E. et al., "Evaluating Liquid Distributors in Hydroprocessing Reactors," Hydrocarbon Processing 79(11) 2000 pp. 76-78 808284.

Boniface, A, "(Distillation Liquid and Vapor) Distributors," The Chemical Engineer (ISSN 0302-0797) N. 469 pp. 19, 21, 23-24 (Feb. 1990) Institution of Chemical Engineers.

Bolles, William L. "Multipass Flow Distribution and Mass Transfer Efficiency for Distillation Plates," Monsanto Company, 800 N. Lindbergh Blvd., St. Louis, Missouri 63166; AIChE Journal vol. 22, Issue 1, pp. 153-158, published online Jun. 17, 2004.

Siegel, M.H. et al., "An Air-Lift Reactor Analysis the Interrelationships Between Riser, Downcomer, and Gas-Liquid Separator Behavior, Including Gas Recirculation Effects," AIChE Journal, v 32, n 10, Oct. 1986, pp. 1677-1689.

\* cited by examiner

LIQUID DISTRIBUTION IN CO-CURRENT CONTACTING APPARATUSES

CROSS-REFERENCE TO RELATED APPLICATIONS

This application claims the benefit of priority of U.S. Provisional Application Ser. No. 61/141,702, filed Dec. 31, 2008, hereby incorporated by reference in its entirety.

FIELD OF THE INVENTION

The invention relates to contacting apparatuses for performing vapor-liquid contacting such as in fractional distillation or other mass and/or heat transfer operations. The invention more specifically relates to liquid distribution systems for distributing liquid to contacting modules used to provide high capacity, high efficiency co-current vapor-liquid contacting.

DESCRIPTION OF RELATED ART

Vapor-liquid contacting devices, such as fractionation trays and packings, are employed to perform a wide variety of separations, particularly in the petroleum and petrochemical industries. Fractionation trays, for example, are used separating hydrocarbons into fractions having a similar relative volatility or boiling point. These fractions include crude oil-derived products of petroleum refining and petrochemical processing, such as naphtha, diesel fuel, LPG, and polymers. In some cases, trays are used to separate specific compounds from others of the same chemical or functional class, for example alcohols, ethers, alkylaromatics, monomers, solvents, inorganic compounds, etc. Trays are also used in gas processing and absorptive separation operations. A wide variety of trays and other contacting devices having differing advantages and drawbacks have been developed.

Fractionation trays and packings are the predominant forms of conventional vapor-liquid contacting devices used in distillation apparatuses, for example, in the applications described above. In the case of trays, a typical fractionation column will utilize about 10 to 250 of these contacting devices, depending on the ease of the separation (relative volatility difference) and desired product purity. Often the structure of each tray in the column is similar, but it is also known that the structures may differ (e.g., alternate) with respect to vertically adjacent trays. Trays are mounted horizontally, normally at a uniform vertical distance referred to as the tray spacing of the column. This distance may, however, vary in different sections of the column. The trays are often supported by rings welded to the inner surface of the column wall.

Fractional distillation has traditionally been conducted in cross flow or counter current contacting devices having an overall downward liquid flow and upward vapor flow. At some point in the apparatus the vapor and liquid phases are brought into contact to allow the vapor and liquid phases to exchange components and achieve, or approach as closely as possible, vapor-liquid equilibrium with each other. The vapor and liquid are then separated, moved in their respective directions, and contacted again with another quantity of the appropriate fluid at a different stage. In many conventional vapor-liquid contacting devices, vapor and liquid are contacted in a cross flow arrangement at each stage. An alternative apparatus differs from traditional multi-stage contacting systems in that while the overall flow in the apparatus continues to be countercurrent, each stage of actual contacting between the liquid and vapor phases is at least partially performed in a co-current mass transfer zone.

During fractional distillation processes using conventional trays, vapor generated at the bottom of the column rises through a large number of small perforations spread over the decking area of the tray, which supports a quantity of liquid. The passage of the vapor through the liquid generates a layer of bubbles referred to as froth. The high surface area of the froth helps to establish a compositional equilibrium between the vapor and liquid phases on the tray. The froth is then allowed to separate into vapor and liquid. During vapor-liquid contacting, the vapor loses less volatile material to the liquid and thus becomes slightly more volatile as it passes upward through each tray. Simultaneously the concentration of less volatile compounds in the liquid increases as the liquid moves downward from tray to tray. The liquid separates from the froth and travels downward to the next lower tray. This continuous froth formation and vapor-liquid separation is performed on each tray. Vapor-liquid contacting devices therefore perform the two functions of contacting the rising vapor with liquid and then allowing the two phases to separate and flow in different directions. When the steps are performed a suitable number of times on different trays, multiple equilibrium stages of separation can be achieved, leading to the effective separation of chemical compounds based upon their relative volatility.

Many different types of vapor-liquid contacting devices including packings and trays have been developed in an effort improve such separations. Different devices tend to have different advantages. For instance, multiple downcomer trays have high vapor and liquid capacities and the ability to function effectively over a significant range of operating rates. Structured packings tend to have a low pressure drop, making them useful in low pressure or vacuum operations. Perforated decks are efficient contacting devices, but can cause high pressure drop in a column, especially when used in a relatively small deck area, even if the fractional open area is high. Two important parameters used to evaluate the performance of any vapor-liquid contacting device are capacity and efficiency. Both of these, however, may be compromised if maldistribution of liquid or vapor occurs in a vapor-liquid contacting apparatus. Maldistribution of liquid or vapor has a tendency to propagate from one stage to the next, reducing the capacity and efficiency of the apparatus as a whole.

Particular examples of known vapor-liquid contacting devices include, for example, those described in U.S. Pat. No. 6,682,633 for co-current contacting of vapor and liquid in a number of structural units which are placed in horizontal layers. U.S. Pat. No. 5,837,105 and related U.S. Pat. No. 6,059,934 disclose a fractionation tray having multiple co-current contacting sections spread across the tray.

Other devices and apparatuses incorporating these devices, which address the issues discussed above and other considerations, are described in U.S. Pat. No. 7,424,999, hereby incorporated by reference. These devices are contacting modules in horizontal stages and differ from a conventional tray-like construction. The modules of one stage are rotated to be non-parallel with respect to the modules of an inferior stage, a superior stage, or both. The contacting modules include at least a liquid distributor (downcomer) and a demister (vapor-liquid separator) which together define a contacting volume, namely a co-current flow channel. Ascending vapor enters the contacting volume and entrains liquid that is discharged from the liquid distributor. The ascending vapor and entrained liquid are carried co-currently in the contacting volume to the demister, which partitions or separates the vapor and liquid such that these streams can separately flow upward and downward, respectively, after contact. Liquid exiting the demister flows onto a receiving pan and is then directed downward through a duct. Each of the ducts associated with a single receiving pan direct the liquid into a separate downcomer of an inferior contacting stage. Vapor exiting the demister flows to a fluid transfer volume above the receiving pan and then into the contacting volume of a superior contacting stage.

The devices described above and others require effective distribution of fluids including feeds that may be introduced at various levels into vapor-liquid contacting apparatuses such as distillation columns. For example, in the case of apparatuses employing stages with modules having co-current flow channels, the manner in which fluid (e.g., a liquid column feed), is introduced above a given stage to each module of that stage has a significant impact on the overall performance of the apparatus. In particular, each stage of a high capacity, high efficiency contacting apparatus may have 10 or more individual vapor-liquid contacting volumes. The optimal delivery of fluid to each downcomer of a contacting module, and consequently to each contacting volume or co-current flow channel, therefore represents an important challenge that has prompted continuing efforts to seek improvements.

SUMMARY OF THE INVENTION

The present invention is associated with the discovery of improved distribution systems for liquid feeds and other fluids into a vapor-liquid contacting apparatus, for example from an inlet external to the apparatus (e.g., an external liquid feed inlet). The distribution systems are especially applicable for the delivery of fluids to contacting modules used in carrying out vapor-liquid contacting, and particularly to contacting modules defining co-current flow channels, where liquid that is distributed into a downcomer is subsequently discharged into the co-current flow channel where it is contacted with, and entrained by, rising vapor. An important consideration is the ability to deliver fluids, such as liquid feeds, optimally to each module. Especially desired in the case of incoming liquid feed streams, for example, is the ability to distribute the liquid in proportion to the length of each contacting module, and particularly the length of each demister, of a given stage to which the liquid is introduced. This objective becomes increasingly more difficult with the size of the vapor-liquid contacting apparatus (e.g., a distillation column), which impacts not only the number of downcomers but also the number of different lengths of downcomers to which liquid must be distributed.

Another consideration addressed by the distribution systems described herein is the ability to beneficially avoid or minimize contact between the liquid being distributed and vapor flowing within the apparatus. High capacity, high efficiency contacting devices, such as those containing co-current flow channels, are normally used in services with high vapor velocities and consequently a high susceptibility for liquid within the distillation column or other vapor-liquid contacting apparatus using these contacting devices to become entrained. Effective distribution devices must therefore avoid or at least minimize unwanted liquid entrainment without placing any constraints on the apparatus in terms of operating capacity.

Embodiments of the invention are therefore directed to fluid distribution systems, and especially liquid distribution systems, that can effectively distribute fluids to a number of areas simultaneously and in proportions effective for improving or optimizing the overall performance of a vapor-liquid contacting apparatus (e.g. a distillation or fractionation column employing contacting modules with co-current flow channels). These fluid distribution systems also beneficially minimize the entrainment of liquids being distributed in upwardly flowing vapor. Representative distribution systems comprise at least one extended trough having a plurality of outlet spouts. The distribution systems may also comprise pre-distribution piping in fluid communication with both an inlet external to the apparatus and at least one extended trough. Such systems are especially beneficial when used in combination with contacting stages (e.g., arranged orthogonally from one stage to the next) comprising a plurality of contacting modules defining co-current flow channels.

Representative embodiments of the invention are therefore directed to apparatuses for vapor-liquid contacting comprising a liquid distribution system in combination with a high capacity, high efficiency contacting stage defining co-current flow channels. Other embodiments are directed to liquid distribution systems comprising at least one extended trough having a plurality of spouts aligned for distribution into a plurality of downcomers in non-parallel alignment with respect to the trough.

In a particular embodiment, the liquid distribution system comprises at least one extended (e.g., horizontally extended) trough having a plurality of outlet spouts and a contacting stage having at least two contacting modules. Each contacting module comprises at least one downcomer having an outlet proximate at least one co-current flow channel, a demister having an inlet surface proximate the co-current flow channel and an outlet surface superior to a receiving pan, as well as at least one duct having an upper end in fluid communication with the receiving pan. The lower end of each duct may be in fluid communication with a separate downcomer of an inferior stage. Also, the contacting module may be rotated (e.g., at a 90° angle) with respect to a contacting module of an immediately inferior stage in the apparatus. This degree of rotation may be consistent with, or may differ from, the degree of rotation used with respect to other adjacent contacting modules in the apparatus.

In another particular embodiment, the invention is directed to an apparatus for performing co-current vapor-liquid contacting. The apparatus comprises a liquid distribution system comprising pre-distribution piping in communication with both an external fluid inlet to the apparatus and at least one extended trough having a plurality of outlet spouts. The liquid distribution system is superior to a contacting stage having at least two contacting modules and a plurality of receiving pans. Each of the contacting modules comprises a pair of substantially parallel demisters being spaced apart and a downcomer located between the demisters and defining, with inlet surfaces of the demisters, a pair of co-current flow channels. The inlet surfaces of the demisters are in fluid communication with the co-current flow channels, the downcomer has an outlet in fluid communication with the co-current flow channels, and the demisters have outlet surfaces superior to separate receiving pans of the plurality of receiving pans. Also, the outlet spouts of the liquid distribution system are in fluid communication with the downcomers of the contacting modules. According to a particular embodiment each receiving pan has at least one duct, with each duct of one receiving pan providing fluid communication to a separate downcomer of an inferior stage. In another specific embodiment, the contacting module is in non-parallel alignment with respect to a contacting module of an immediately inferior stage in the apparatus. Alternatively or in conjunction, the troughs are in non-parallel alignment with respect to the downcomers.

In any of the embodiments described above, the outlet spouts of the liquid distribution system trough(s) are aligned for liquid distribution to the downcomers of the contacting modules. The number of outlet spouts will therefore generally be at least equal to the number of downcomers with which the troughs are in fluid communication (i.e., to which the troughs distribute fluid). Often, however, a plurality of spouts are used in each vertically aligned region of distribution from a trough to a downcomer. The outlet spouts may be slotted or otherwise have any suitable cross-sectional shape, for example, a circle, rectangle (e.g., square), oval, or polygon. Combinations of different shapes are possible. The outlet spouts are generally located on the bottom of the trough, for example, on a bottom surface or face, but they may also be located on one side, or on opposite sides, of the trough, with the main consideration being that the configuration allows liquid exiting the spouts to enter a downcomer of a contacting module at a stage immediately below.

Advantageously, the number of troughs of a representative distribution system may be less than the number of downcomers of the contacting stage that the distribution system feeds. In a representative embodiment, for example, the numbers of troughs and downcomers in fluid communication with these troughs are two and four, respectively. As with adjacent contacting stages within the apparatus, the trough(s) of the liquid distribution system are preferably rotated with respect to the downcomers of the immediately inferior stage, to which the troughs are aligned for fluid distribution. Typically, for example, the troughs are rotated to extend orthogonally, meaning they are rotated at an angle of about 90° (e.g., from about 80° to about 100°) with respect to the downcomers. Pre-distribution piping is normally used to distribute a fluid, such as a liquid feed stream (e.g., from an external inlet to the vapor-liquid contacting apparatus), to the trough or, more commonly, plurality of troughs.

In order to increase liquid handling capacity or improve flow management, expanded chutes or other flow directing elements may be used to lead liquid from the outlet spouts of the troughs to the downcomers of contacting modules of a contacting stage below that of the troughs. According to one embodiment, each trough may be integral with an expanded chute or other flow directing element (e.g., the trough(s) may be formed as one piece or may be welded, bolted, banded, or otherwise fastened or affixed (e.g., in a sealing manner) to the expanded chutes). According to an alternative embodiment, the trough may feed or be in liquid communication with one or a plurality of expanded chutes or conduits without being physically attached. For example, an outlet spout, or plurality of outlet spouts, of the trough may be proximate one or more expanded chutes or conduits in order to discharge liquid therein (e.g., from above the chutes or from within the chutes, for example, in the case where the trough has an outlet spout inside the inlet of the expanded chutes). The attachment of troughs to expanded chutes or other flow directing elements, for example, in a sealing manner, prevents entrainment of liquid exiting the trough by upwardly rising vapor in the apparatus. In some cases, however, a space between the outlet spouts of the trough(s) and elements to direct flow to liquid conduits is desired for venting purposes.

The liquid distribution system, according to some embodiments, may be positioned above all of the contacting stages in a vapor-liquid contacting apparatus, for example, above (i) all of the high capacity, high efficiency contacting stages comprising modules defining co-current flow channels, (ii) all of the conventional (e.g., tray) contacting stages, or (iii) all of both of these types of stages. In other embodiments, however, the liquid distribution system may be positioned at an intermediate location or height within the vapor-liquid contacting apparatus, for example below a superior contacting stage. In a representative embodiment, when the liquid distribution system is in fluid communication, optionally through pre-distribution piping, with an external feed inlet to a central region in the vapor-liquid contacting apparatus, a superior contacting stage may be superior to or above both the feed inlet and the liquid distribution system, while the contacting stage to which liquid is distributed may be inferior to or below both the feed inlet and the liquid distribution system. In this case, the contacting stage above or superior to the liquid distribution system may have ducts that directly feed (i.e., are in liquid communication with) downcomers of contacting modules in the contacting stage to which the liquid distribution system distributes liquid. Otherwise, this superior contacting stage may have ducts in fluid communication with the trough(s) of the liquid distribution system.

Regardless of whether the superior contacting stage directly feeds downcomers of the immediately inferior contacting stage or the liquid distribution system, the number of ducts of the superior contacting stage will often be reduced to accommodate the liquid distribution system between the superior and inferior contacting stages. Therefore, while the inferior contacting stage may have a number of ducts (e.g., with upper ends communicating with receiving pans of this contacting stage) that are representative of the number of ducts used in most, or all other, contacting stages of the apparatus, the number of ducts of the superior contacting stage will often be less than this representative number. In another embodiment in which the liquid distribution system communicates with an external liquid feed inlet to an intermediate position, level, or stage in the apparatus, the extended trough of the liquid distribution system may be open at an upper perimeter, for example taking the form of a chimney tray to collect and distribute liquid from the feed inlet to a contacting stage immediately below.

According to other embodiments, the apparatus comprising the liquid distribution system and contacting stage, as discussed above, will further comprise a bottom, inferior contacting stage. Often, this bottom contacting stage, as with the superior contacting stage discussed above, will have a number of ducts that is less than a representative number used in other contacting stages. The reduced number of ducts may be for ease of installation of the bottom contacting stage, for example to allow the ducts of this contacting stage to extend below a bottom vapor feed inlet to the apparatus.

Representative contacting stages as discussed above will normally comprise at least one module (e.g., 1, 2, 3, 4, 5, 6, 7, 8, 9, or 10 modules), each having a downcomer associated with two demisters. Representative contacting stages have modules in a parallel, alternative arrangement with receiving pans, where the number of receiving pans in a stage will generally exceed the number of downcomers by one, due to the placement of terminal receiving pans on both ends of each stage.

Further embodiments of the invention relate to methods for contacting vapor and liquid streams comprising passing the streams through a co-current flow channel in an apparatus comprising both a liquid distribution system and a contacting stage having contacting module that defines the co-current flow channel, as described herein.

These and other embodiments relating to the present invention are apparent from the following Detailed Description.

The same reference numbers are used to illustrate the same or similar features throughout the drawings. The drawings are to be understood to present an illustration of the invention and/or principles involved. As is readily apparent to one of skill in the art having knowledge of the present disclosure, apparatuses, contacting modules, or liquid distribution systems according to various other embodiments of the invention will have configurations and components determined, in part, by their specific use.

DETAILED DESCRIPTION

Figure 1:
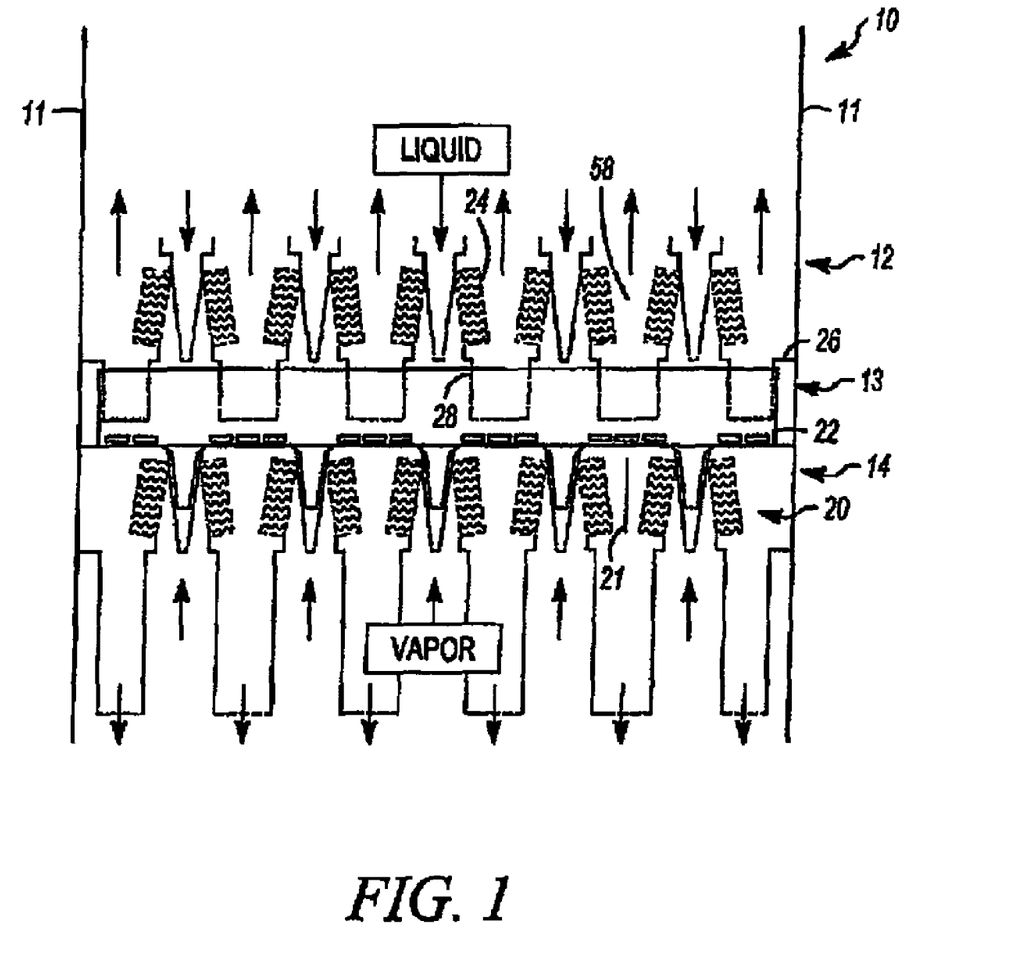
FIG. 1 is a cross-sectional schematic of a representative apparatus comprising contacting stages with contacting modules.

FIG. 1 illustrates a high efficiency, high capacity vapor-liquid contacting apparatus, comprising stages within a vessel 10. The vessel 10 includes an outer shell 11 that typically has a cylindrical cross section. The vessel 10 may be, for example, a distillation column, absorber, direct contact heat exchanger, or other vessel used to conduct vapor-liquid contacting. The vessel 10 comprises contacting stages, including superior contacting stage 12, intermediate contacting stage 13, and inferior contacting stage 14, whereby adjacent contacting stages are arranged in a non-parallel, and in particular an orthogonal, relationship with one another. A fractionation or distillation column typically contains from about 10 to about 250 or more of such contacting stages. The design of contacting modules 20 of these stages may be essentially uniform throughout the column, but it may also vary, for example, to accommodate changes in fluid flow rates in different parts of the column. For simplicity, only three contacting stages are shown in FIG. 1.

It is understood that an apparatus such as a distillation column may contain several sections, with each section having numerous contacting stages. Also, there may be a plurality of fluid feed introductions and/or fluid product withdrawals between and/or within sections. Conventional contacting devices (e.g., trays and/or packings) used in distillation may be mixed in the same and/or different sections of the apparatus (e.g., above and/or below), as the sections having contacting stages described herein.

According to the embodiment of FIG. 1, the 90° rotation of contacting stage 13 with respect its immediately superior stage 12 and immediately inferior stage 14, allows for liquid distribution in a direction that is orthogonal to the immediately adjacent stages to reduce liquid maldistribution. In other embodiments, vertically adjacent contacting stages may be oriented with different degrees of rotation that may be the same from stage to stage or may vary. Each contacting stage 12, 13, 14 comprises a plurality of contacting modules 20 and receiving pans 26.

Figure 2:
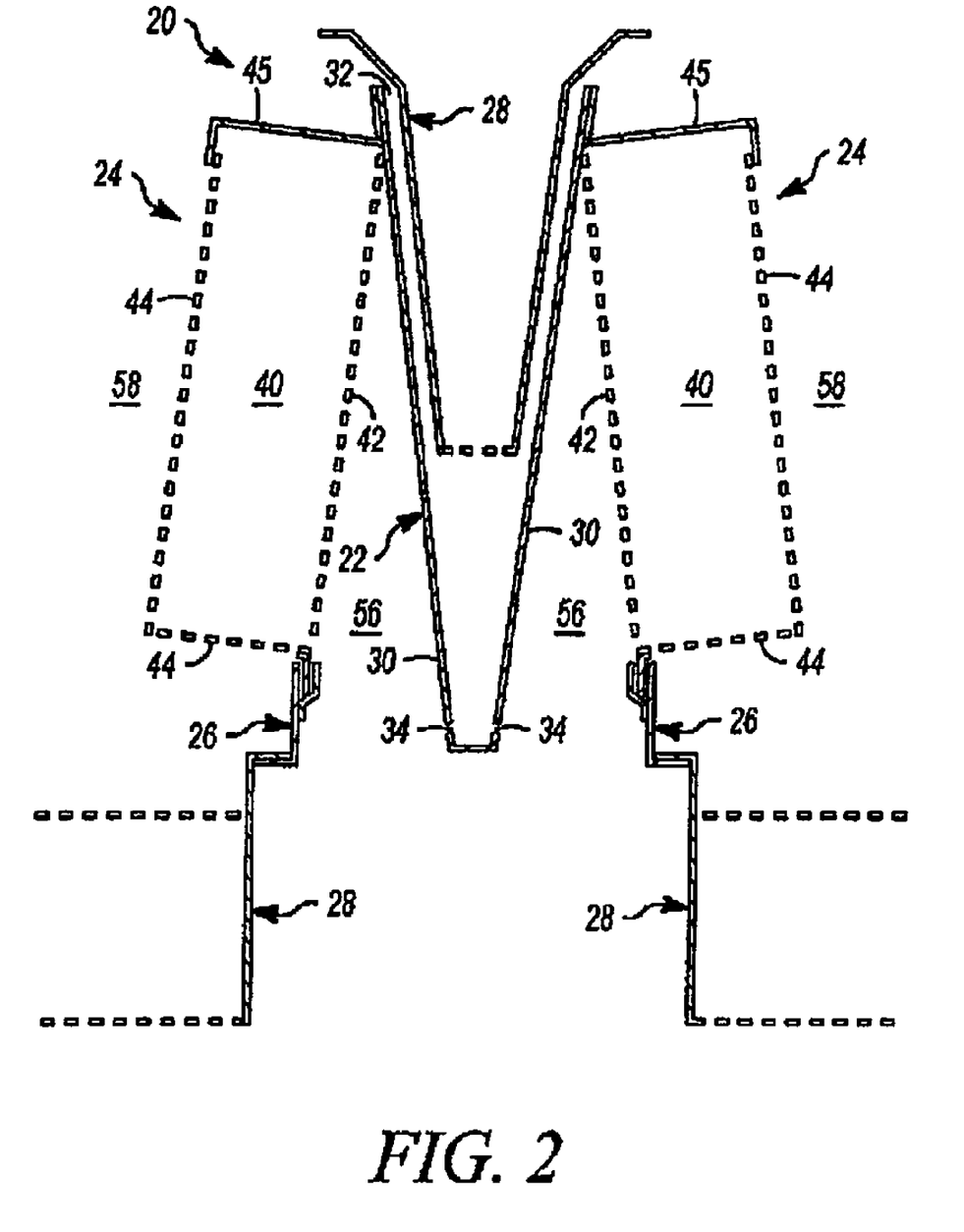
FIG. 2 is a cross-sectional schematic of a representative individual contacting module.

As shown in FIG. 2, contacting modules 20 may include a liquid distributor or downcomer 22 located between a pair of vapor-liquid separators or demisters 24. The downcomer 22 and demisters 24 cooperate to define a co-current fluid contacting volume or co-current flow channel 56. In addition to the contacting modules 20, each stage also includes a plurality of receiving pans 26, with each receiving pan 26 having a plurality of ducts 28. An inlet 32 to the downcomer 22 is configured to engage the ducts 28 of a receiving pan of the immediately superior contacting stage.

As illustrated in FIG. 1, a vertical baffle 21 is optionally included between two adjacent contacting modules 20 in order to intercept vapor emanating from the demisters 24 and, in general, to reduce any tendency of the emerging fluids to interfere with each other in a fluid transfer volume 58 above receiving pans 26. The vertical baffle 21 may be situated between and substantially parallel to the demisters 24 of adjacent contacting modules 20. According to FIG. 2, downcomer 22 has an inlet 32 in an upper portion and an outlet 34 having one or more outlet openings in a lower portion. Two sloped downcomer walls 30 taper the downcomer 22 in the downward direction. The bottom of the substantially V-shaped downcomer 22 near outlet 34 may be pointed, curved, or flat as shown in FIG. 2. Alternative embodiments having downcomers of various different shapes, such as stepped or sloped and stepped, are possible. In further embodiments the cross sectional shape of the downcomer may be rectangular (e.g., square), or it may be curved, irregular, or otherwise configured to define a desired co-current flow channel and geometry for delivering liquid thereto. A V-shaped downcomer, as shown, provides a combination of a large contacting volume between the demisters 24 and downcomer walls 30 in the lower portion of each stage and a large downcomer inlet 32 in the upper portion for accommodating enlarged ducts 28 and increasing liquid handling capability.

The downcomer outlet 34 generally has a plurality of slots, perforations, or other types of openings arranged in one or more rows near the bottom of the downcomer 22. The downcomer openings may be located in the walls 30 and/or the bottom of the downcomer. In operation, a liquid level (not shown), in the downcomer 22 provides a seal to prevent the ascending vapor from entering the downcomer through the outlets 34. The openings of downcomer outlet 34 are preferably distributed along the length of the downcomer 22 and they may be arranged such that the openings are varied in size or number or eliminated in the portions of the downcomer 22 that are above an inferior downcomer, to help prevent liquid from flowing directly from one downcomer into the inferior downcomer.

According to FIG. 2, rows of demisters 24 may be assembled from a plurality of individual demister units 40 that include male and female end plates to form seals between the units and substantially prevent fluid leakage through the junction. Other ways to join units of demister rows include the use of suitable fasteners such as bolts, clips, pins, clamps, or bands. Mechanisms such as a male and female tab and slot combination can provide advantages for quick assembly and disassembly. Welding is also possible. The modular configuration of the demisters 24 allows a fabricator to produce demister units in one or a small number of standard sizes to be assembled into demister rows 24 of varying length. Some custom-sized demister units may be required for particularly short demister rows 24 or to match the length of a downcomer 22 depending on the dimensions of the apparatus and the variety of standard size demister units available. The modular design has the further advantage of easing the assembly of the contacting module 20 since the demister units are lighter than an entire row of demisters formed of a single unit. However, according to some embodiments, a single demister unit can also be the complete demister 24.

Demisters 24 are used to de-entrain liquid droplets from a vapor stream. One example is a mist eliminator, such as a vane type demister having various channels and louvers such that the fluid stream passing through the demister must undergo several changes in direction, forcing entrained liquid droplets to impact portions of the separation structure and flow downward to the bottom of the demister. Examples of separation structures for demisters (or vapor-liquid separation devices) are mesh pads or woven threads. Combinations of these structures can also be used. Many possible variations in the design of the separating structures in demister units 40 are possible, the important consideration being the effectiveness of these structures in separating entrained liquid from a flowing vapor stream. This effectiveness is thought to correlate with the number of obstructions in the fluid flow which cause liquid droplets to impact a solid surface. Structures having numerous dead ends may lead to the formation of relatively quiescent regions, also promoting liquid separation.

As shown in FIG. 2, various optional elements may cooperate with and/or be incorporated into the demister 24 to further improve the performance and/or structural integrity of the overall apparatus. For example, a perforated inlet plate 42 as an inlet surface, a perforated outlet plate 44 as an outlet surface, and an imperforate top plate 45 are shown. Perforated plates are one type of flow manipulator that may cooperate with the demister 24. Other non-limiting examples of flow manipulators for demister 24 include expanded metal, porous solids, mesh pads, screens, grids, mesh, profile wire screens, and honeycombs. It has been found that the fractional open area of the flow manipulators affect both separation efficiency and pressure drop of the demister 24. The fractional open area of the flow manipulators may vary on different sides and on the same side of the demister to optimize the separation efficiency and pressure drop of the demister 24. Various types of flow manipulators may be used in a single demister. In other embodiments, flow manipulators are not used on some or any of the inlet and outlet surfaces of the demister.

The perforated inlet plate or other flow manipulator at inlet surface 42 is proximate the downcomer 22. The perforated outlet plate 44 extends also the majority of the demister side opposite the perforated inlet surface 42 and along the bottom of the demister unit 40. The imperforate top plate 45 prevents liquid from leaving the demister unit 40 directly from the top and increases the vapor-liquid separation efficiency. The imperforate top plate 45 has bent strips on both sides, one following downcomer wall 30 for attaching with the wall and the other following the perforated outlet plate 44 of the demister 40 for connecting with the perforated outlet plate 44. It has been found that the imperforate strip extending down a distance from the top of the perforated outlet plate 44 also improves vapor-liquid separation efficiency. The strip typically extends to cover from about 5% to about 30%, and generally from about 10% to about 20%, of the height of the demister outlet.

Vapor may enter into downcomer 22 with liquid flow from a superior stage or through downcomer outlet 34 when one or more of its openings is not completely sealed by a liquid level 25 in downcomer 22. If vapor in the downcomer 22 is not properly vented from its inlet 32, it will be forced into ducts 28, which may choke the liquid flow through the ducts and cause severe entrainment and premature flooding of the apparatus. Therefore, it is generally beneficial to vent the vapor in downcomer 22 through gaps between ducts 28 and downcomer 22 or openings at the top of the downcomer 22 between ducts 28. The bottom of duct 28 is opened with one or more openings, for example a plurality of holes or one continuous slot or single larger opening to allow liquid to flow into the downcomer 22. Under normal operating conditions, ducts 28 are sealed against vapor flow either dynamically by liquid in the ducts 28 or statically by liquid in the downcomer 22.

The volume between inlet surface 42 of demister 24 and the adjacent wall 30 of the downcomer 22 forms a fluid contacting volume or co-current flow channel 56, shown in FIG. 2. After co-current flows of vapor and liquid are contacted in co-current flow channel 56, fluid contacting continues in demister units 40 before vapor and liquid are separated. A perforated plate or other flow manipulator at inlet surface 42 of demister 24 improves fluid flow distribution through demister 24 and improves vapor-liquid separation. A flow manipulator at inlet surface 42 may also improve fluid contacting and mass transfer. The volume above receiving pan 26 and between demister rows 24 that it supports defines fluid transfer volume 58. The rows of demisters 24 may be oriented at an angle from vertical as illustrated in FIG. 2 to provide improved geometries of co-current flow channel 56, having a decreasing volume from bottom to top (to match decreasing vapor flow in this volume) and fluid transfer volume 58, having an increasing volume from bottom to top (to match increasing vapor flow in this volume).

The fluid flows through a contacting module 20 of an intermediate stage 12 include liquid flow from a superior stage 12 that is directed into the downcomer 22 by several receiving pans 26 of a superior stage, in cooperation with ducts 28 of this superior stage. The liquid, which forms a liquid level in the downcomer 22, exits the downcomer 22 through outlet 34 and enters the co-current flow channel 56. The upward vapor velocity is sufficient in co-current flow channel 56 to entrain the entering liquid. The entrained liquid is carried upward by the rising vapor to the inlet surfaces 42 of the demister units 40. The vapor and liquid are separated by the separating structures, as discussed above, within demister units 40, such that the separated vapor exits demister units 40 predominantly through the outlet surface 44 into fluid transfer volume 58. The separated vapor then continues upward to a co-current flow channel 56 of a superior contacting stage 12. The separated liquid exits the demister units 40 through the bottom portion of outlet surface 44 and flows onto the receiving pan 26. The receiving pan 26 then directs the separated liquid into the plurality of ducts 28, each of which ducts 28 of a given receiving pan direct the liquid into a different inferior downcomer 22.

According to other embodiments, in lieu of perforated inlet plates 42, a porous blanket layer such as mesh pad may be used to cover the inlet to the demister units 40. The use of this porous blanket has been found to improve vapor-liquid separation, especially during operation at higher vapor rates. The porous blanket can be of conventional mesh material used for liquid droplet de-entrainment or so called "mist eliminators." It will typically comprise very loosely woven strands forming a high surface area, low pressure drop blanket. The mesh blanket is for fine droplet coalescence and liquid distribution to the separator. An alternative construction involves mounting the mesh in an indentation in a separation structure inside a demister unit 40.

Downcomers and the receiving pans at each stage may be supported by support rings affixed to the inner surface of the vessel wall or outer shell by welding or other conventional means. The downcomers and their associated receiving pans may be bolted, clamped, or otherwise secured to the support ring to maintain them in a desired position or column height during operation and to prevent fluid leakage across the stages, outside of desired contacting areas. Receiving pans located between two contacting modules, and those located between a module and the vessel shell or outer wall, are referred to as central and terminal receiving pans, respectively. Central receiving pans are thus shared by two adjacent contacting modules. In another embodiment a pair of receiving pans is incorporated into each contacting module. When such modules are arranged in a substantially parallel alignment across a stage, the modules are adjacent such that there are two receiving pans between each pair of adjacent downcomers.

It will be appreciated, therefore, that each contacting stage will generally have an arrangement of receiving pans, ducts, and downcomers, with receiving pans being arranged substantially parallel on a given stage and spaced apart across the cross sectional area of the apparatus or vessel. Downcomers of a contacting module are located between each pair of adjacent receiving pans of the same contacting stage, resulting in an alternating pattern of receiving pans and contacting modules. Demisters of these contacting modules generally run substantially along the length of downcomer in rows on either side. A plurality of ducts extends through the receiving pans of one stage into the downcomer inlet of an inferior stage, with each of the ducts that extends through a particular receiving pan directing liquid into a different inferior downcomer. The top of the ducts are normally flush with the horizontal surfaces of the receiving pans so that liquid may flow freely from the receiving pans into the ducts without any obstruction. In other embodiments the ducts may hang from the receiving pan by having a lip that rests on the horizontal surface of the receiving pan when the ducts are fitted through the openings. The ducts may also be mounted to the underside surface of the receiving pans.

Aspects of the present invention are directed to systems for optimizing the distribution of liquids, for example from inlets external to the apparatus, to the downcomers of any particular stage. Stages of particular interest include the top stage, to which, for example, liquid from an overhead condenser of a distillation column must be distributed. Also, a liquid feed to the vapor-liquid contacting apparatus is often introduced above an intermediate stage and must be distributed effectively. Because the downcomers of a given stage, as well as their associated co-current flow channels and demisters, normally vary in length over the cross section of the apparatus, the amount of liquid distributed to these downcomers should vary as well.

In particular, it is preferable that (1) the amount of liquid received by a given downcomer of a contacting module is proportional to the total length of the demister associated with that downcomer, and also (2) the liquid distributed from each side of a downcomer is proportional to the length of the demister on that side. These requirements may be substantially or completely fulfilled using liquid distribution systems in which one or more extended troughs, optionally having pre-distribution piping from the liquid source external to the apparatus to the trough(s), are used to distribute liquid to the downcomers from a plurality of outlet spouts. The requirements (1) and (2) above may be satisfied by varying the outlet spout (or liquid exit) areas of a trough in locations in which the trough communicates with a particular downcomer and side of a downcomer.

Figure 6:
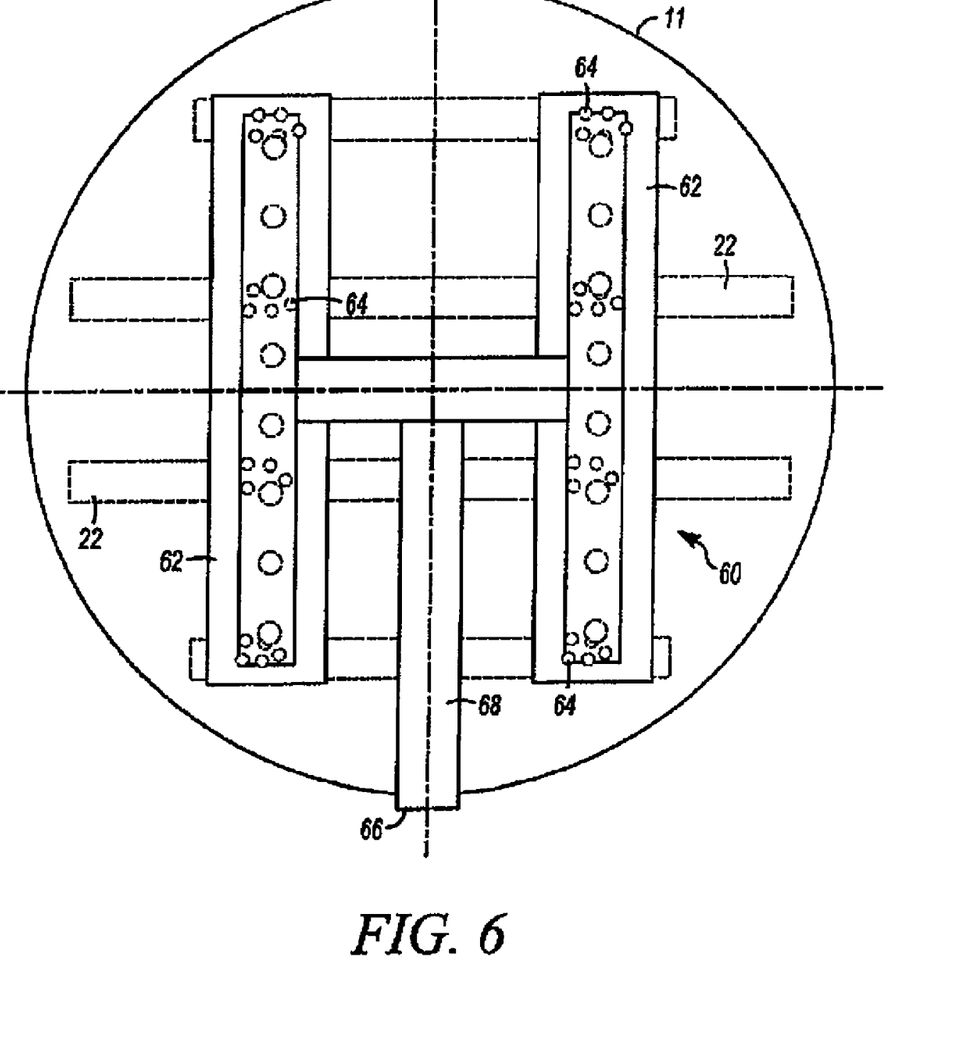
FIG. 6 is a top view of a representative liquid distribution system having troughs in fluid communication with downcomers of a contacting module of an inferior stage.

FIG. 6 illustrates a representative liquid distribution system 60 having two troughs 62 extending horizontally across a substantial portion of the cross section defined by outer shell 11 of a vapor-liquid contacting apparatus. Each of the two extended troughs has a plurality of outlet spouts 64 for delivering a desired proportion of liquid, such as from a liquid feed stream from an external inlet 66 of the apparatus, to each of four downcomers 22 inferior to or below the troughs 62. Downcomers 22, for example, may be those of a top or uppermost contacting stage of a vessel, such that liquid distribution system 60 is positioned above all of the contacting stages of the apparatus. The liquid distribution system 60 also has associated distribution piping, in this case shown as an "H" pipe distributor communicating with each trough 62 of the two-trough liquid distribution system. In the case of large vapor-liquid contacting apparatuses (e.g., distillation columns), an additional horizontal layer of trough distribution, with more than two troughs, may be included below the two-trough liquid distribution system shown in FIG. 6 to minimize the liquid travel distance inside downcomers 22 and further improve liquid distribution. As is illustrated in FIG. 6, troughs 62 extend orthogonally or perpendicular with respect to downcomers 22, such that each trough 62 is separately in fluid communication, through outlet spouts 64, with all of the downcomers 22 below.

Figure 7:
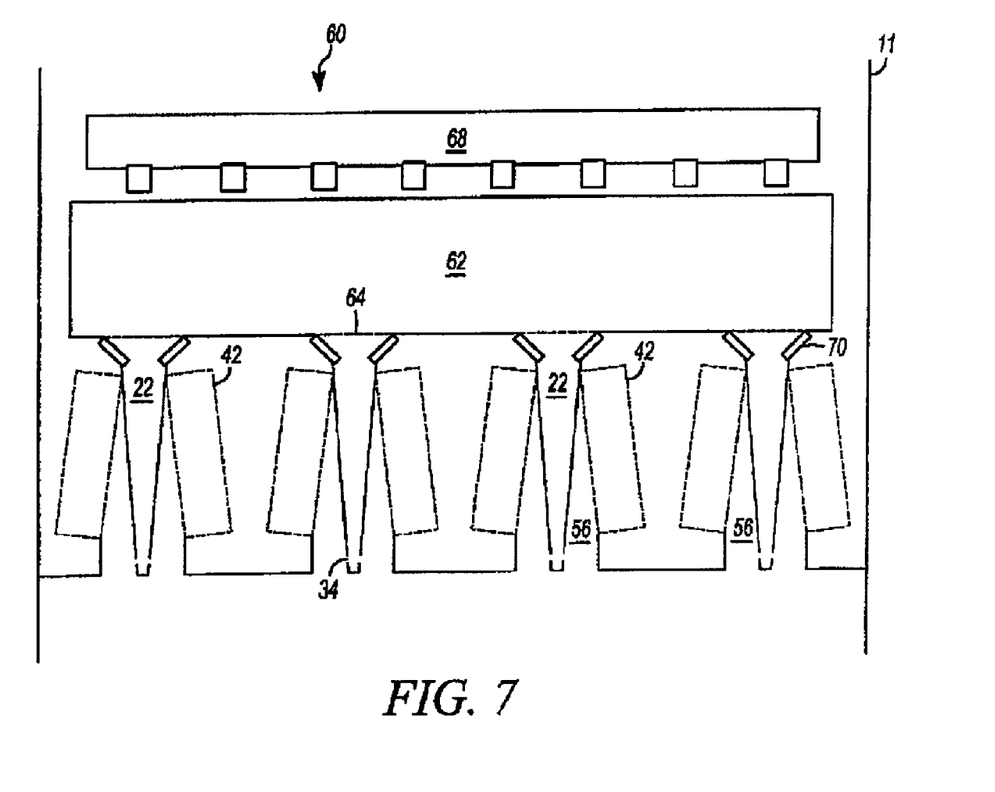
FIG. 7 illustrates a liquid distribution system having troughs with expanded chutes that direct liquid into downcomers of contacting modules, of an inferior stage, which define co-current flow channels.

Thus, outlet spouts 64 at or near the bottom of troughs 62 are open to areas that intersect or are in vertical alignment with downcomers 22. If desired, for example in the case where the intersected or vertically aligned areas are insufficient for a specified flow rate of liquid to be distributed from the troughs to a downcomer (or a particular portion of the downcomer), these vertically aligned distribution or transfer areas can be increased by either increasing the width of the trough or using flow directing elements such as chutes 70 as shown in FIG. 7 to direct liquid from the spouts 64 of troughs 62 to downcomers 22. In general, it is preferred to minimize the tolerance or gap between the bottom of troughs 62 and the top of downcomers 22, to which the troughs feed or distribute liquid (i.e., with which the troughs are in liquid communication). For example, a typical clearance between the bottom of a trough 62 and the top of its associated downcomer 22 is less than about 15 cm (6 inches) and often is in the range from about 1 cm (0.4 inches) to about 10 cm (4 inches). As is illustrated in FIG. 7, a co-current flow channel 56 or vapor-liquid contacting zone is on each side of downcomer 22.

Figure 8:
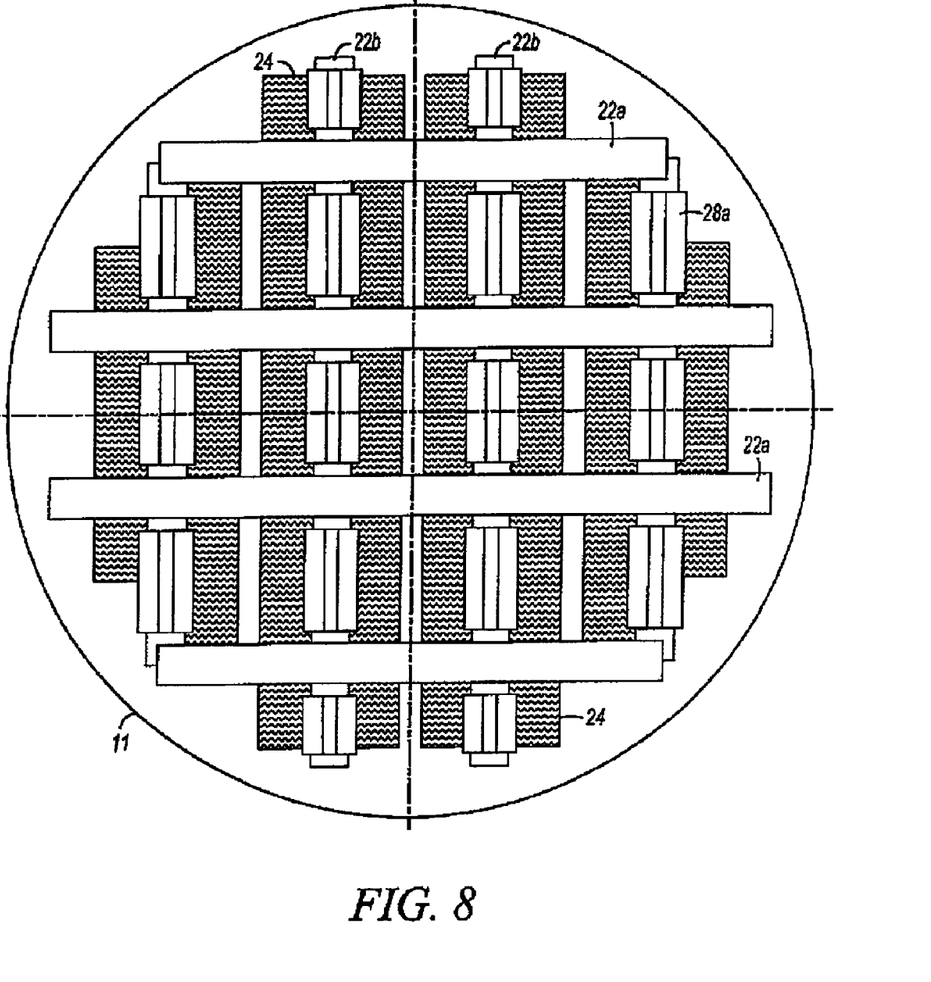
FIGS. 8-11 are top views of contacting stages having varying amounts of ducts to accommodate liquid distribution systems.

FIG. 8 shows a top view of a representative contacting stage with four downcomers 22a, associated with four contacting modules of an upper or superior stage, which convey liquid to four downcomers 22b of a lower or inferior stage. Some of the feature of the upper stage have been removed to illustrate that a total of sixteen ducts 28a (e.g., extending from receiving pans (not shown)) are used for this liquid transfer to the inferior stage. For stages with a greater number of downcomers and contacting modules, more ducts are generally required for effective liquid transfer.

Figure 3:
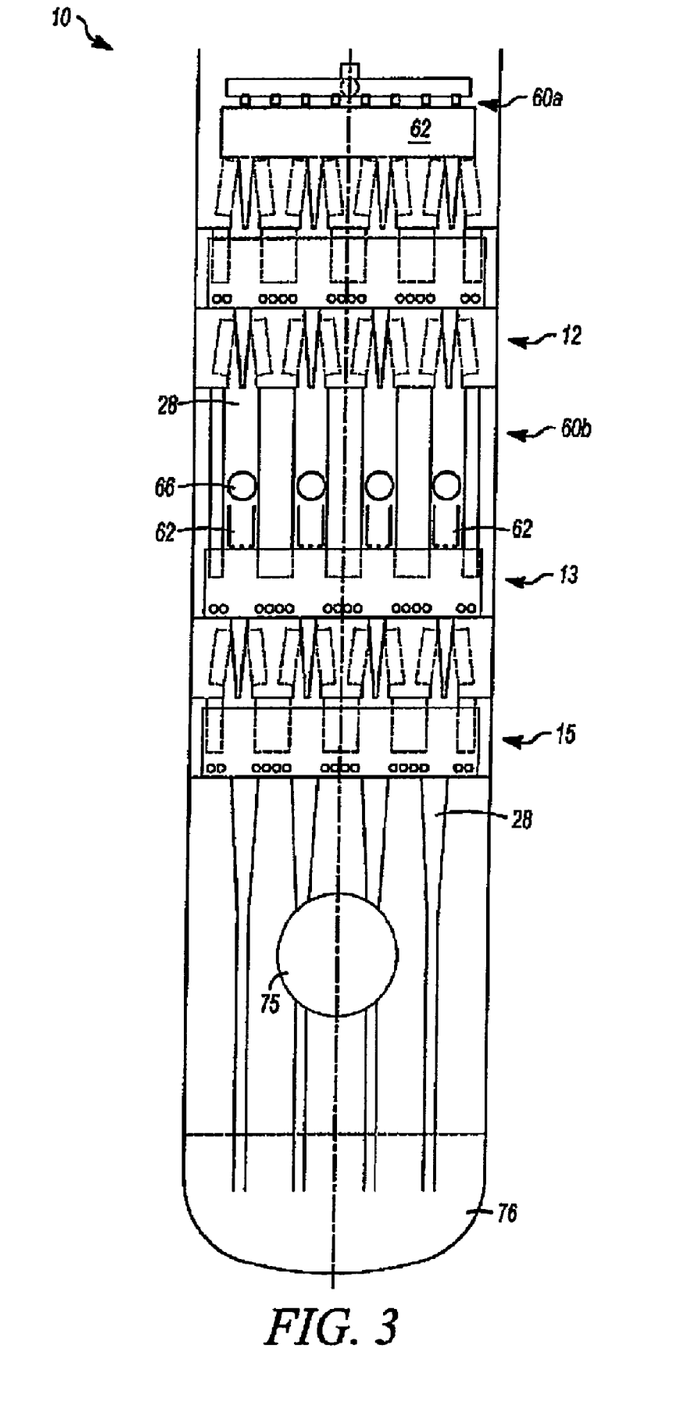
FIGS. 3-5 are cross-sectional schematics of representative apparatuses comprising liquid distribution systems positioned above all contacting stages and also positioned below a superior contacting stage. The latter distribution systems have different flow configurations. Also shown is a bottom contacting stage having a reduced number of ducts.

FIG. 3 depicts a representative vapor-liquid contacting apparatus 10, having liquid distribution systems 60a, 60b positioned in the top of the apparatus (above all contacting stages) and also positioned below a contacting stage 12 that is superior to a liquid feed inlet 66, with the feed inlet in turn being above an intermediate contacting stage 13. The lower of the two distribution systems 60b therefore acts as a middle liquid feed distributor (or middle liquid feed distribution system). To accommodate this distribution system 60b, the spacing between superior stage 12 and intermediate stage 13 is increased relative to that used for other vertically adjacent contacting stages. Despite the increased spacing between these contacting stages 12 and 13, liquid from superior stage 12 is nevertheless transferred via ducts from this stage, which are in fluid communication with downcomers of contacting stage 13, in the normal manner. The liquid distribution system 60b below superior stage 12 can comprise extended troughs as discussed above. Pre-distribution piping in fluid communication with a liquid feed inlet distributes liquid feed to these extended troughs, which have outlet spouts that, in turn, distribute the liquid feed to downcomers of contacting stage 13. Liquid is conveyed by ducts from superior stage 12 to downcomers of contacting stage 13 as well, and, according to this embodiment, this liquid bypasses troughs 62 of the middle liquid feed distribution system 60b. The upper liquid distribution system 60a of FIG. 3 may also comprise a trough, as discussed above, extending perpendicular with respect to downcomers to which liquid is distributed. Advantageously, this non-parallel alignment allows the number of troughs used to be less than the number of downcomers, as illustrated in FIG. 6.

Figure 4:
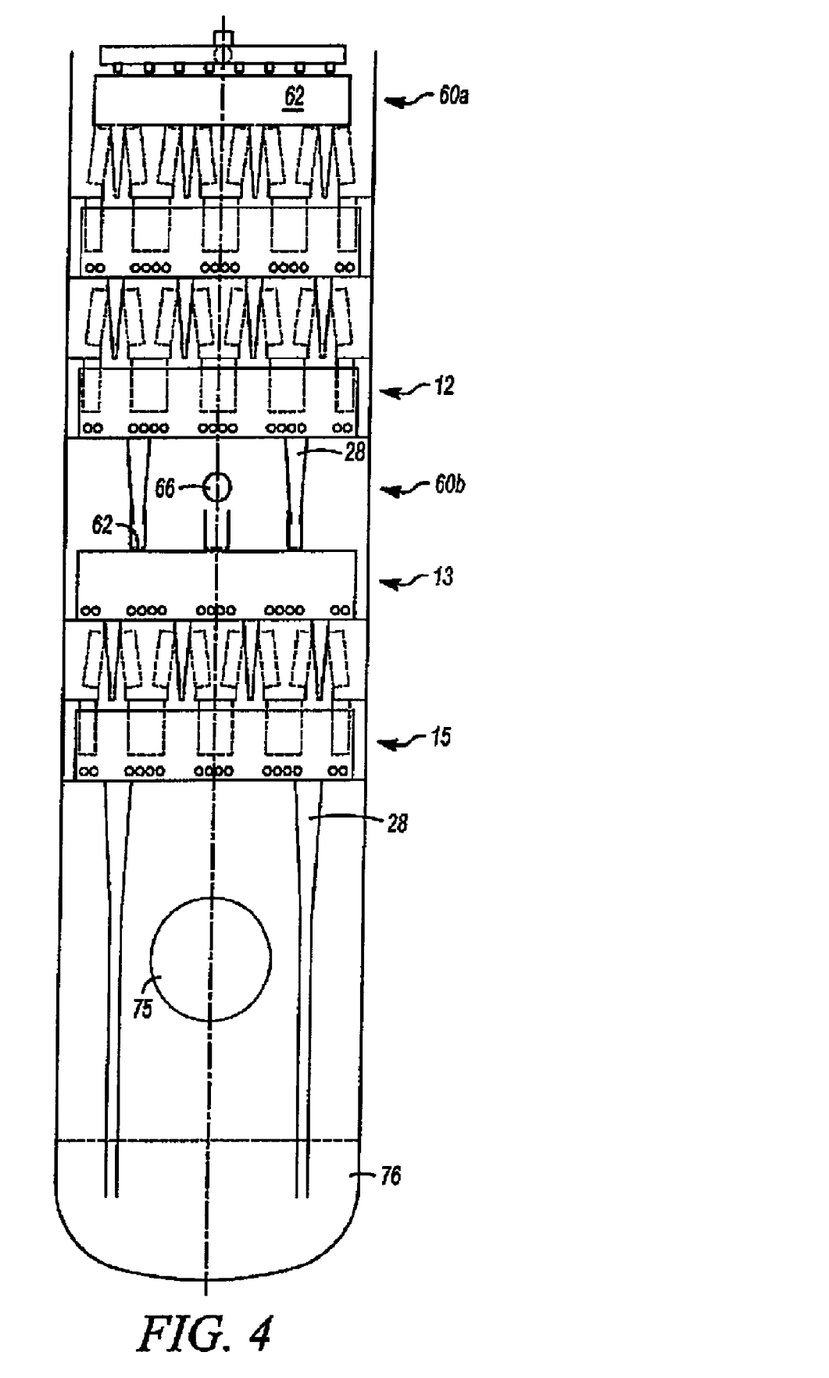
Figure 10:
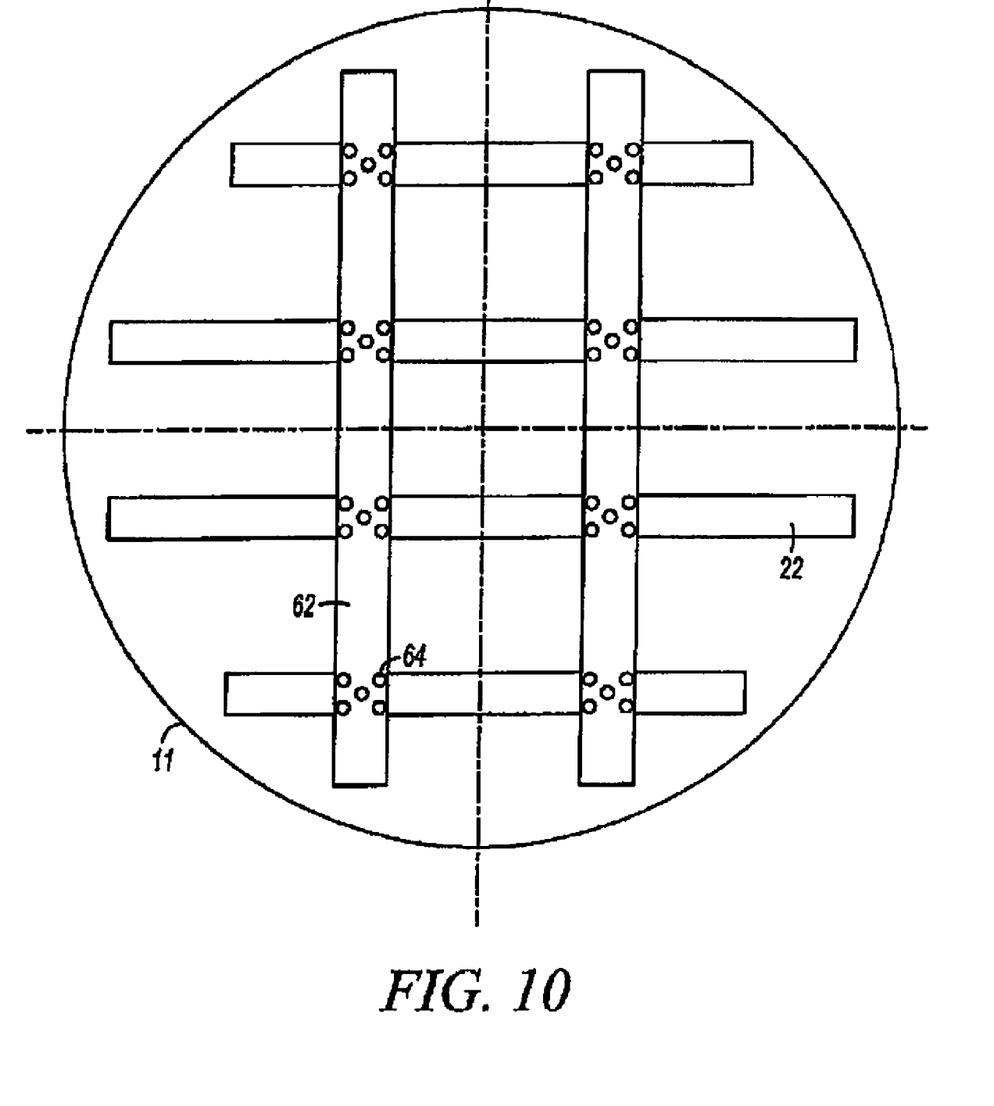

Regarding the previous description of FIG. 8, it is apparent that the horizontal spacing between ducts on normal contacting stages can be limited. Therefore, with respect to the superior contacting stage 12 above the middle feed distributor, a smaller number of ducts may be used, relative to those used in contacting stage 13, which may have a number of ducts that is representative of all other, or a significant fraction of the other, stages in the vapor-liquid contacting apparatus. The use of a smaller number of ducts to conserve space within the apparatus for a middle feed distributor is illustrated in FIG. 4, in which, for example, two rows of ducts rather than the representative number four rows for that apparatus are used. These ducts 28 transfer liquid from superior stage 12, in this case to troughs 62 of middle liquid feed distribution system 60b, which then distributes liquid to downcomers of contacting stage 13, as may be illustrated by the top view of troughs 62 of a middle liquid feed distribution system in FIG. 10.

Figure 5:
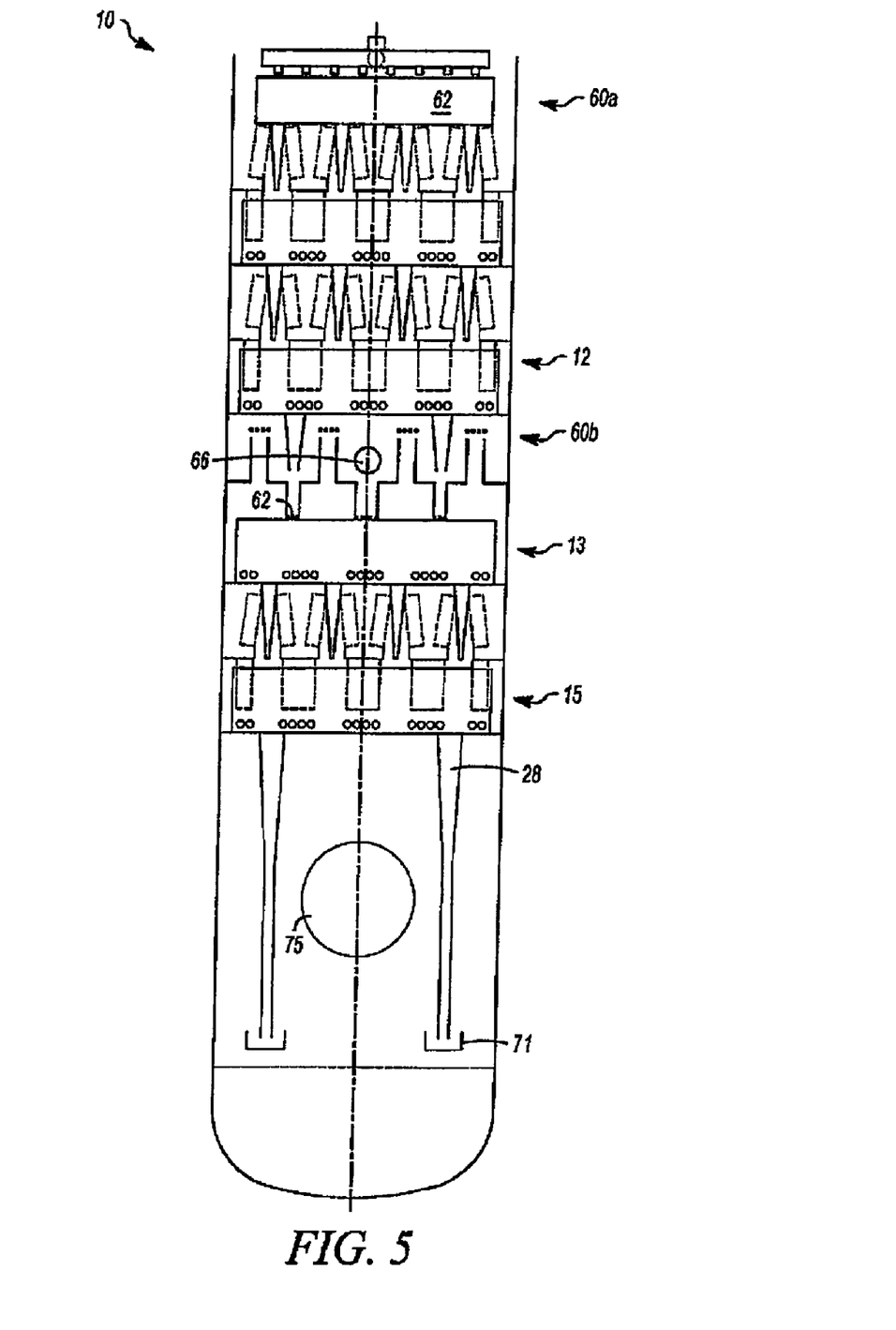
Figure 9:
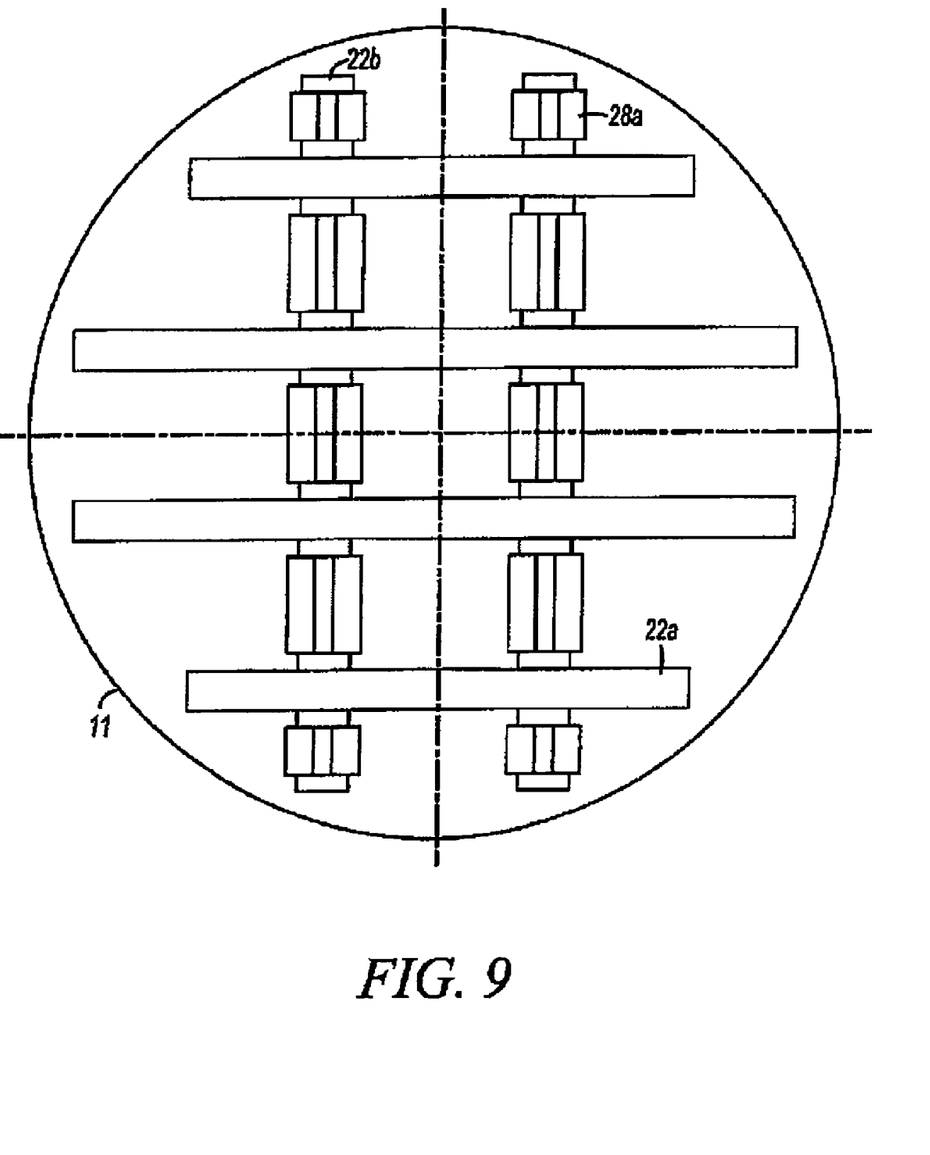
Figure 11:
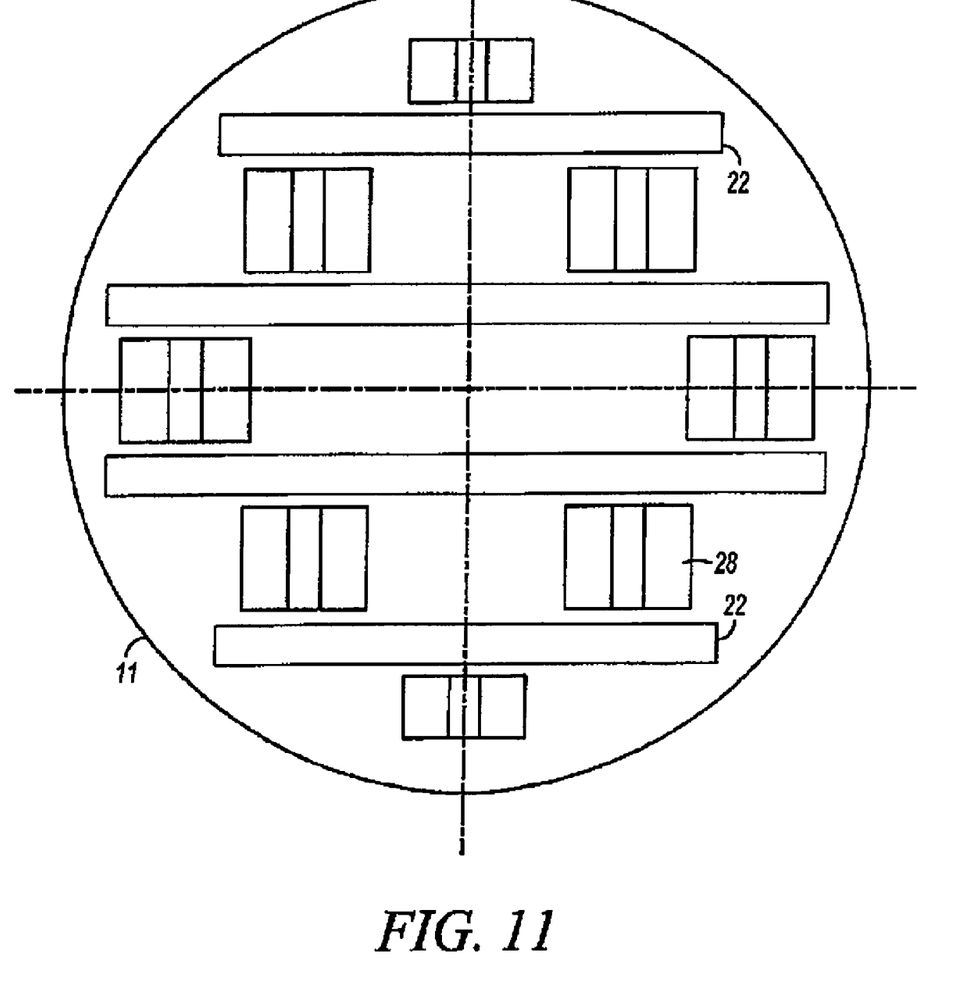

A configuration of downcomers 22a, 22b of superior and inferior stages, similar to the top view of FIG. 8, is shown in FIG. 9. However, FIG. 9 illustrates in a representative embodiment how the number of ducts 28a may be reduced in a stage, in order to accommodate fewer downcomers in an inferior contacting stage. Likewise, a reduced number of ducts may be used to transfer liquid from a contacting stage 12 to inferior troughs 62 or a bottom contacting stage 15 to below a bottom vapor inlet 75 and ultimately to sump 76, as is shown in FIGS. 3-5. Ducts 28 leading to sump may be sealed at their bottoms either statically (hydraulically) by a liquid level in the sump or dynamically by flowing liquid. The discharge of liquid from ducts 28 from the bottom stage to below vapor inlet 75 advantageously prevents discharged liquid from becoming entrained. Also, the reduced number of ducts 28 from bottom stage 15 can be strategically positioned for easy installation of this stage around vapor inlet 75 or other structures. FIG. 11, for example, illustrates a system of ducts 28 positioned peripherally about the circumference of vessel wall 11.

FIG. 5 illustrates another embodiment in which the middle liquid feed distribution system 60b has an extended trough 62 that is open at an upper perimeter and therefore acts as a chimney tray to distribute the middle liquid feed, as well as and liquid from superior contacting stage 12, to adjacent, inferior contacting stage 13. FIG. 5 also shows additional seal pans 71 attached to the bottom of conduits 28 extending from bottom stage 15 and directing liquid from bottom stage 15 into the sump.

Overall, aspects of the invention are directed to the use of liquid distribution systems in contacting modules for carrying out vapor-liquid contacting, and especially in co-current contacting modules used for high capacity, high efficiency contacting under conditions of high liquid and vapor flows. Those having skill in the art will recognize the advantages of the equipment and associated methods described herein and their suitability in other applications. In view of the present disclosure, it will be appreciated that other advantageous results may be obtained. Those having skill in the art, with the knowledge gained from the present disclosure, will recognize that various changes can be made in the above equipment and methods without departing from the scope of the present disclosure. Mechanisms used to explain theoretical or observed phenomena or results, shall be interpreted as illustrative only and not limiting in any way the scope of the appended claims.

The invention claimed is:

1. An apparatus for performing co-current vapor-liquid contacting, comprising:
    a) a liquid distribution system comprising at least one extended trough having a plurality of outlet spouts; and
    b) a contacting stage having at least two contacting modules, each contacting module comprising:
        i) at least one downcomer having an outlet proximate at least one co-current flow channel;
        ii) a demister having an inlet surface proximate said co-current flow channel and an outlet surface superior to a receiving pan; and
        iii) at least one duct having an upper end in fluid communication with said receiving pan, and a lower end, wherein said lower end of each duct is in fluid communication with a separate downcomer of an inferior stage;

wherein said outlet spouts are aligned for liquid distribution to said downcomers of said contacting modules and wherein the number of troughs of said distribution system is less than the number of downcomers of said contacting stage and wherein said liquid distribution system is positioned below a superior contacting stage in said apparatus.

2. The apparatus of claim 1, wherein said superior contacting stage is superior to a feed inlet to said apparatus and said contacting stage is inferior to said feed inlet.

3. The apparatus of claim 1, wherein said superior contacting stage comprises a plurality of ducts in fluid communication with said downcomers of said contacting stage.

4. The apparatus of claim 1, wherein said superior contacting stage comprises a plurality of ducts in fluid communication with said at least one extended trough.

5. The apparatus of claim 4, wherein the number of ducts of said superior contacting stage is less than the number of ducts of said contacting stage.

6. An apparatus for performing co-current vapor-liquid contacting, comprising:
    a) a liquid distribution system comprising at least one extended trough having a plurality of outlet spouts; and
    b) a contacting stage having at least two contacting modules, each contacting module comprising:
        i) at least one downcomer having an outlet proximate at least one co-current flow channel;
        ii) a demister having an inlet surface proximate said co-current flow channel and an outlet surface superior to a receiving pan; and
        iii) at least one duct having an upper end in fluid communication with said receiving pan, and a lower end, wherein said lower end of each duct is in fluid communication with a separate downcomer of an inferior stage;

wherein said outlet spouts are aligned for liquid distribution to said downcomers of said contacting modules and wherein the number of troughs of said distribution system is less than the number of downcomers of said contacting stage and further comprising a bottom contacting stage inferior to said contacting stage and having a number of bottom ducts that is less than the number of ducts of said contacting stage.

7. The apparatus of claim 6, wherein said bottom ducts extend below a bottom vapor inlet.

* * * * *